US007224578B2

(12) United States Patent
Buck et al.

(10) Patent No.: US 7,224,578 B2
(45) Date of Patent: May 29, 2007

(54) ERGONOMIC CONTROL PANEL FOR A PORTABLE ELECTRIC GENERATOR

(75) Inventors: John E Buck, Cockeysville, MD (US); Peter E Morris, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 43 days.

(21) Appl. No.: 10/914,683

(22) Filed: Aug. 9, 2004

(65) Prior Publication Data

US 2005/0018373 A1 Jan. 27, 2005

Related U.S. Application Data

(63) Continuation of application No. 09/873,468, filed on Jun. 4, 2001, now Pat. No. 6,801,425.

(51) Int. Cl.
*H02B 1/52* (2006.01)
*H02B 1/26* (2006.01)

(52) U.S. Cl. ...................... 361/625; 361/628; 361/634; 307/153; 322/14

(58) Field of Classification Search ................ 361/679, 361/625, 628, 634; 307/153; 322/14
See application file for complete search history.

(56) References Cited

U.S. PATENT DOCUMENTS 2,361,768 A * 10/1944 Conant et al. ................. 74/16
2,898,542 A * 8/1959 Cholick et al. ............... 322/90
2,937,832 A * 5/1960 Treiber ....................... 248/678
3,194,525 A * 7/1965 Webb .......................... 410/46
D205,975 S * 10/1966 Sato et al. ..................... D15/1
4,173,951 A * 11/1979 Ishihara ......................... 123/2
D275,946 S * 10/1984 Ekuan ....................... D13/116
D276,515 S * 11/1984 Yaguchi .................... D13/116
D277,954 S * 3/1985 Mizushima ................ D13/114
4,526,228 A * 7/1985 Wynn ......................... 166/53

(Continued)

FOREIGN PATENT DOCUMENTS

DE 3528148 A1 * 2/1987

(Continued)

OTHER PUBLICATIONS

European Search Report dated Aug. 12, 2003 for P-EP-TN2579, 3 pages.*

(Continued)

*Primary Examiner*—Anatoly Vortman
(74) *Attorney, Agent, or Firm*—Harness, Dickey & Pierce, P.L.C.

(57) ABSTRACT

A control panel for a portable electric generator. The control panel includes three distinct zones having logically organized switches and outlets. The first zone includes those switches used most frequently. The second zone includes a plurality of 120 VAC electrical outlets and at least one 120/240 VAC outlet. The 120 VAC outlets are separated from the 120/240 VAC outlet by a horizontally arranged, rocker style voltage selector switch for selecting either 120/240 VAC or 120 VAC operation. A third zone includes an auto throttle control for controlling an engine of the generator. The placement and organization of the switches and electrical outlets within clearly defined zones reduces the possibility of the operator unintentionally selecting the wrong outlet for use or unintentionally selecting the wrong switch.

28 Claims, 2 Drawing Sheets

U.S. PATENT DOCUMENTS

| | | | | | |
|---|---|---|---|---|---|
| 4,595,841 | A | * | 6/1986 | Yaguchi | 290/1 A |
| 4,721,070 | A | * | 1/1988 | Tanaka et al. | 123/2 |
| 4,729,353 | A | * | 3/1988 | Streng | 123/195 A |
| 4,798,082 | A | * | 1/1989 | Fujikawa et al. | 73/117.3 |
| 4,907,546 | A | * | 3/1990 | Ishii et al. | 123/41.56 |
| 5,353,762 | A | * | 10/1994 | Dykstra et al. | 123/352 |
| 5,574,622 | A | * | 11/1996 | Brown | 361/625 |
| 5,697,249 | A | * | 12/1997 | Miguchi | 74/16 |
| 5,726,503 | A | * | 3/1998 | Domanski et al. | 290/40 B |
| 5,734,148 | A | * | 3/1998 | Latvis et al. | 219/133 |
| 5,765,995 | A | * | 6/1998 | Springer | 417/40 |
| 5,924,393 | A | * | 7/1999 | Kikuchi | 123/2 |
| 5,965,949 | A | * | 10/1999 | Fukuda et al. | 290/1 A |
| 5,977,667 | A | * | 11/1999 | Hirose | 310/51 |
| 6,034,511 | A | * | 3/2000 | Scott et al. | 322/46 |
| 6,067,945 | A | * | 5/2000 | Fukuda et al. | 123/2 |
| 6,119,636 | A | * | 9/2000 | Fan | 123/2 |
| 6,181,019 | B1 | * | 1/2001 | Frank | 290/1 A |
| 6,313,543 | B1 | * | 11/2001 | Frank | 290/1 A |
| 6,331,740 | B1 | * | 12/2001 | Morohoshi et al. | 290/1 A |
| 6,476,509 | B1 | * | 11/2002 | Chen et al. | 290/1 R |
| 6,541,718 | B2 | * | 4/2003 | Burkholder et al. | 200/50.28 |
| 2002/0125115 | A1 | * | 9/2002 | Burkholder et al. | 200/51.11 |

FOREIGN PATENT DOCUMENTS

| | | | | |
|---|---|---|---|---|
| DE | 4414067 | A1 | * | 10/1995 |
| JP | 09151745 | | * | 6/1997 |
| JP | 2000041347 | A | * | 2/2000 |
| JP | 2000042300 | A | * | 2/2000 |
| JP | 2001123899 | A | * | 5/2001 |

OTHER PUBLICATIONS

Pamphlet, Yamaha Motor Corporation, Yamaha Industrial Generators Delivering Industrial Strength Power, 1996 (6 pgs).
Pamphlet, Honda Generators, Industrial Series (2 pgs).
Pamphlet, Robin Generators, New RGX Series Brushless (3 pgs).
Pamphlet, Homelite Generators (3 pgs).
Pamphlet, Multiquip, MQ Power Generators (7 pgs).
Pamphlet, Onan Mobile Power (4 pgs).

* cited by examiner

ERGONOMIC CONTROL PANEL FOR A PORTABLE ELECTRIC GENERATOR

CROSS-REFERENCE TO RELATED APPLICATIONS

This application is a continuation of U.S. patent application Ser. No. 09/873,468 filed on Jun. 4, 2001 now U.S. Pat. No. 6,801,425. The disclosure of the above application is incorporated herein by reference.

FIELD OF THE INVENTION

The present invention relates to control panels for devices such as portable electric generators, and more particularly to an ergonomic control panel for a portable electric generator.

BACKGROUND OF THE INVENTION

Portable electric generators are used in a wide variety of applications. Such applications include use at construction sites for powering various electric power tools such as drills, saws, lights, electric heaters, etc., as well as in residential applications for providing a back-up source of electric power in the event of a power outage. Such portable electric generators typically have a control panel with a plurality of electrical outlets and switches for selecting certain outlets thereof for use. For example, generators which provide either 120 VAC or 240 VAC use a switch by which the user selects either 120 VAC or 240 VAC operation. Circuit breakers are also often included at various locations on the control panel.

Typically the above-described outlets, breakers and switches are not logically organized on the generator control panel. This can lead to considerable confusion on the part of the user in the event the user is in a hurry to plug a power cord into one of the outlets of the generator or if lighting conditions are not acceptable, leading to difficulty in the operator seeing the switches, outlets or breakers that the user needs to access.

Accordingly, it would be highly beneficial to provide a control panel for a portable electric generator that logically groups the various switches, outlets and circuit breakers used to control operation of the generator into different areas or "zones". More specifically, it would be highly advantageous to provide a plurality of distinct zones on the control panel wherein the various outlets, breakers and switches of the generator are grouped within each zone in a fashion that significantly eases the use of the generator and reduces the possibility of operator error in selecting outlets, switches or breakers.

SUMMARY OF THE INVENTION

The present invention relates to a control panel for a portable electric generator. The control panel is segmented into a plurality of distinct regions or "zones". Each zone includes logically related and organized components to minimize the possibility of the operator accidentally selecting the wrong control or mistakingly trying to engage the plug of a power extension cord with an improper (i.e., non-mating) electrical outlet of the generator.

In a preferred embodiment, an ON/OFF engine switch is included in the first zone. A plurality of electrical receptacles are included within a second zone disposed adjacent to the first zone. A third zone includes a control for controlling the internal combustion engine of the generator.

In one preferred embodiment the first zone also comprises a circuit breaker switch. The circuit breaker switch and the ON/OFF engine switch are further disposed at longitudinally opposite ends of the first zone to reduce the possibility of the operator mistakingly engaging one of these switches when the operator intended to engage the other one of the switches.

The second zone includes at least one, and more preferably a plurality, of electrical outlets for supplying a first voltage, and at least one outlet for supplying a second voltage. In one preferred form the first outlets provide 120 VAC and the second outlet provides 240 VAC. The 240 VAC outlet is further disposed at a longitudinally opposite end of the second zone from the first outlets to minimize the possibility of the operator mistakingly trying to plug in a power cord plug into the wrong outlet. The 240 VAC outlet is further separated from the 120 VAC outlets by a voltage selector switch for selecting either 120 VAC or 240 VAC operation. A plurality of thermal circuit breakers are further disposed closely adjacent each of the outlets to provide a clear indication when the current being drawn by a given outlet has exceeded a maximum predetermined level, thus "tripping" the breaker.

In the preferred embodiments, each of the zones are further laid out as horizontally disposed, rectangular zones positioned adjacent one another. Optionally, one or more longitudinal frame members of a frame of the generator may be used to demarcate the zones from one another. The frame members also provide protection from accidental damage to electrical components on the control panel.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawing, wherein.

DETAILED DESCRIPTION OF THE PREFERRED EMBODIMENTS

Figure 1:
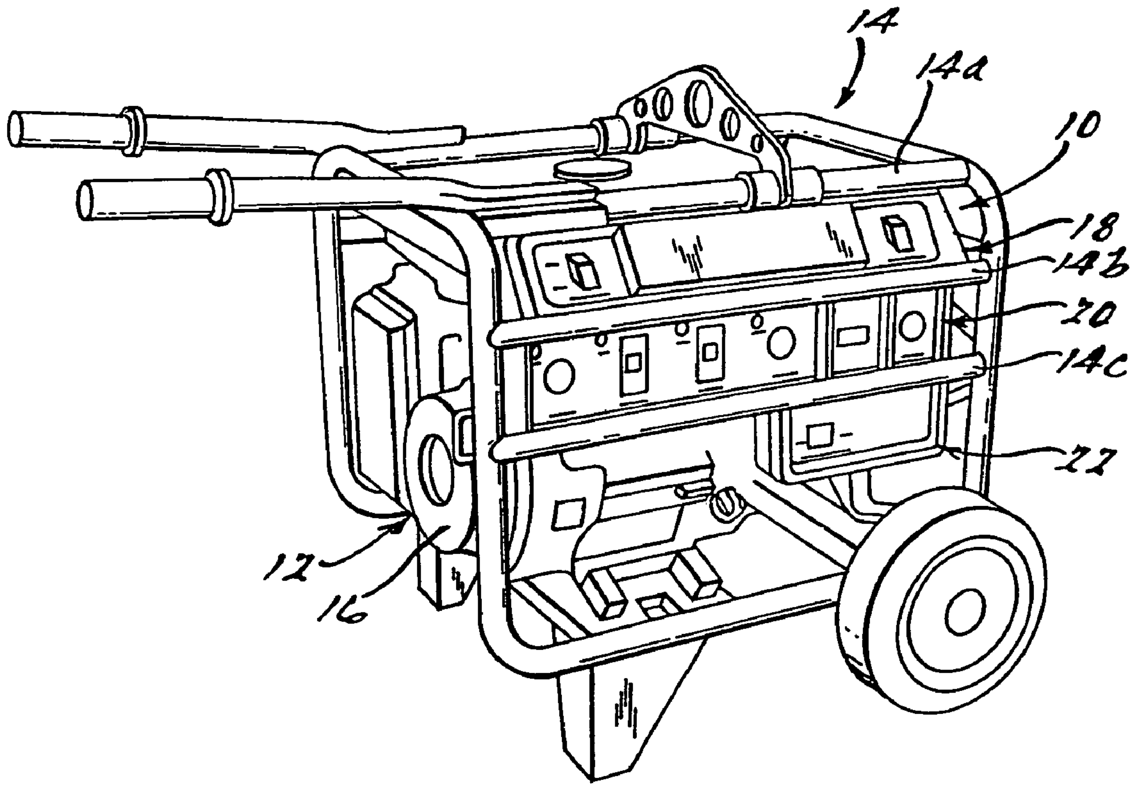
FIG. 1 is a perspective view of a generator incorporating a control panel in accordance with a preferred embodiment of the present invention.

Referring to FIG. 1, there is shown a control panel 10 used with a portable electric generator 12. The generator 12 includes a frame 14 for supporting an internal combustion engine 16. An electric generator (hidden from view) is coupled to an output shaft of the engine 16.

Figure 3:
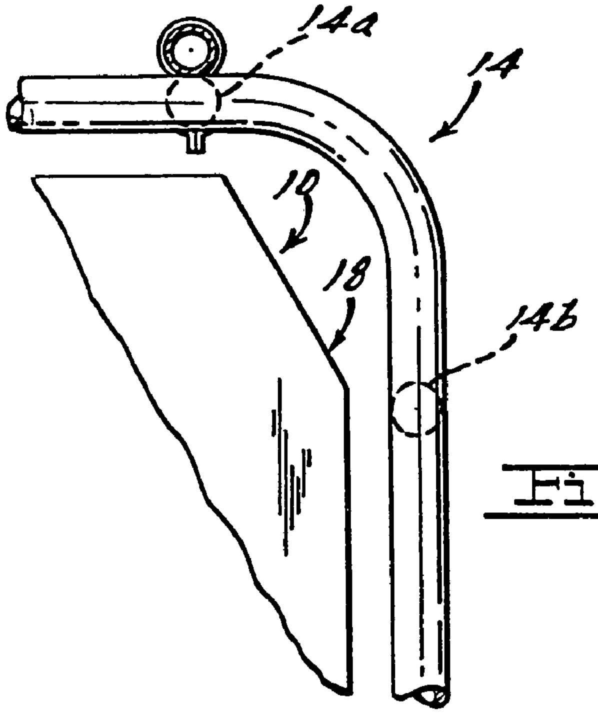
FIG. 3 is an end view of a portion of the generator.
Figure 2:
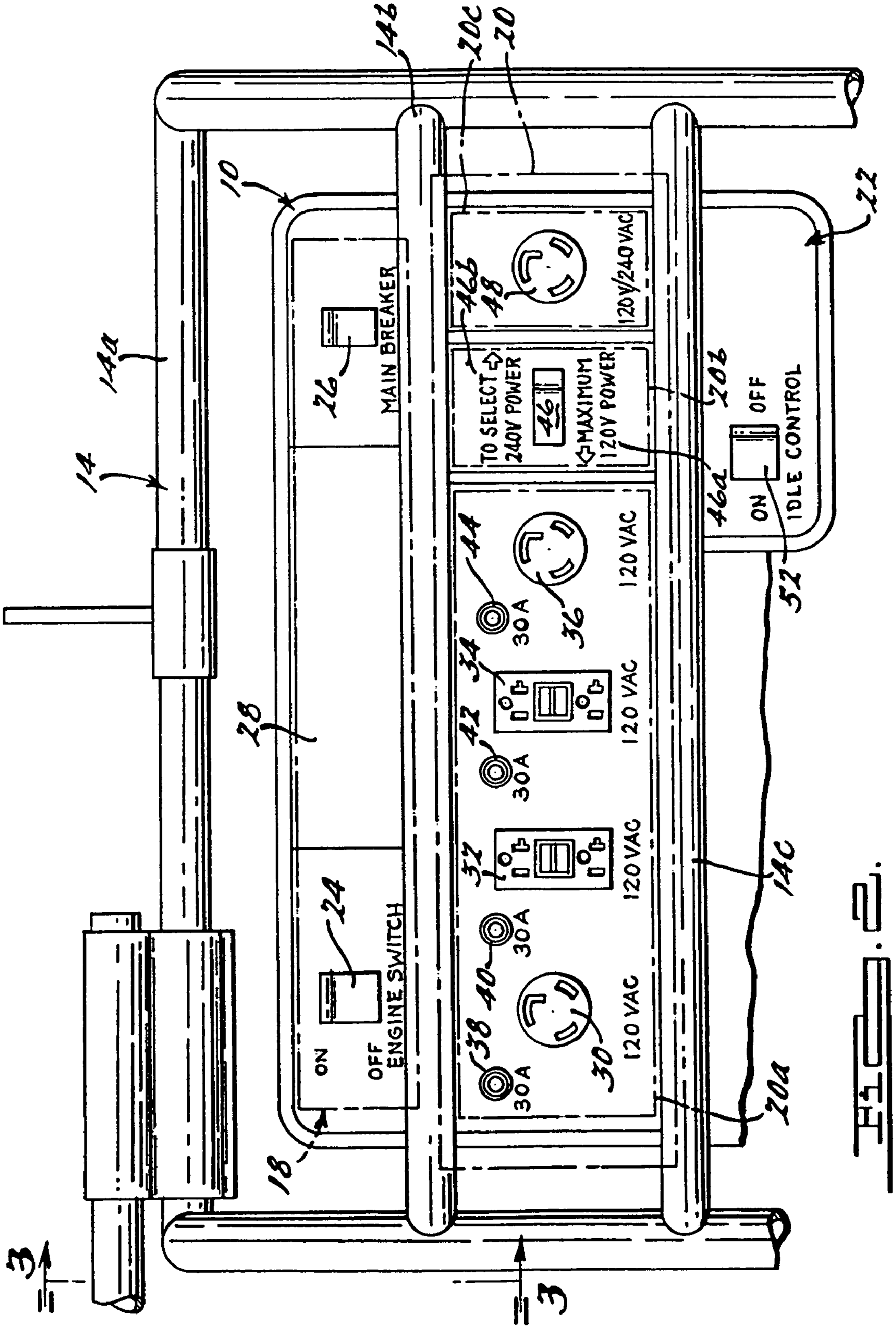
FIG. 2 is an enlarged view of just the control panel and a portion of the generator frame.

Referring to FIG. 2, the control panel 10 is shown in greater detail. The control panel 10 includes a plurality of switches and electrical receptacles which are logically and ergonomically arranged to provide significantly increased ease of use of the generator 12. To this end, the control panel 10 is divided into a plurality of distinct regions or "zones" 18, 20 and 22. The frame 14 further includes tubular frame members **14*a*, 14*b* and 14*c* which are disposed generally parallel to one another, and which further help to demarcate the three distinct zones 18, 20 and 22 of the control panel 10 and to protect the components on the control panel from damage due to accidental contact with other tools or objects. Each zone 18, 20 and 22 comprises a horizontally laid out, generally rectangular area, and each of the zones are arranged parallel to one another. The uppermost zone 18 includes an ON/OFF engine switch 24 at one longitudinal end of the zone 18 and a main circuit breaker switch 26 at the opposite longitudinal end of the zone. The switches 24 and 26 are further separated by an indicia member or area 28 in which a company name or other indicia identifying the manufacturer of the generator 12 may be included. The first zone 18 of the control panel 10 is further formed so as to be inclined slightly relative to the other zones 20 and 22, as indicated in FIG. 3, to present slightly easier access to the switches 24 and 26. Each of the switches 24 and 26** are illustrated as rocker style switches, but it will be appreciated that push button switches, slide style switches, toggle style switches or virtually any other form of switch could easily be incorporated in lieu of rocker style switches.

The second zone 20 is also configured as an elongated, rectangular region. The second zone 20 includes a plurality of electrical receptacles or outlets 30, 32, 34 and 36 arranged within a first subregion 20*a*. Outlets 30 and 36 comprise conventional twist lock receptacles for use with mating male twist lock electrical plugs. Outlets 30 and 36 preferably are capable of supplying 20 to 30 amps of current. Electrical outlets 32 and 34 are ground fault interrupter (GFI) electrical outlets which each supply 120 VAC and preferably up to 20 amps of current or more.

Thermal circuit breakers 38, 40, 42 and 44 are each associated with a respective one of the outlets 30–36. Advantageously, each thermal breaker 38–44 is disposed closely adjacent the electrical receptacle 30–36 with which it is associated. Thus, thermal breaker 38 is associated with outlet 30, thermal breaker 40 is associated with outlet 32, thermal breaker 42 is associated with outlet 34 and thermal breaker 44 is associated with outlet 36.

With further reference to FIG. 2, a voltage selector switch 46 is disposed within a second subregion 20*b* of region 20 while a 120/240 VAC electrical outlet 48 is disposed within a third subzone 20*c* of zone 20. The voltage selector switch 46 in one preferred from comprises a rocker style switch which is laid out horizontally. Indicia 46*a* to the left of switch 46 indicates to the user that depressing the left side of the switch selects the outlets 30–36 for maximum 120 VAC power. Pressing the right side of switch 46 selects outlet 48 for 240 VAC operation. The placement of the switch 46 inbetween the group of outlets 30–36 and outlet 48, along with its horizontal positioning, helps to ensure that the operator realizes which electrical receptacles are being selected for use. By requiring the operator to push the left side of the switch 46 if one or more of the electrical outlets 30–36 are to be used, or to depress the right side of the switch 46 if outlet 48 is to be used, there is a further degree of logical control introduced into the selection of which outlets 30–36 and 48 the operator is selecting for use.

Another advantage to the above-described layout is that the 120/240 VAC electrical outlet 48 is disposed at the longitudinally opposite end of the zone 20*b* from the 120 VAC electrical outlets 30–36. This further helps to reduce the possibility that the operator may inadvertently attempt to plug a 120 VAC electrical plug into the 120/240 VAC outlet 48.

The third zone 22 includes an "Idle Control" on/off switch 52. This switch is typically used less frequently than switches 24, 26 or 46, and is therefore disposed at the lowermost area of the control panel 10. Switches 24 and 26, being much more commonly used, are disposed in the first zone 18. The auto throttle on/off switch 52 is used to choose whether or not the gas engine 16 will run at one constant speed, or throttle up and throttle down automatically depending on current draw on the generator 12.

From the foregoing, then, it will be appreciated that the control panel 10 of the present invention provides the switches, electrical outlets and circuit breakers typically used with a portable electric generator in a highly logically organized arrangement. The arrangement of the control panel 10 into distinct zones further significantly reduces the possibility of the user unintentionally attempting to engage the wrong electrical outlet with a given electrical plug. The placement of the various control switches also significantly improves the convenience of use of the control panel 10 by locating those switches which are accessed most frequently at the upper area of the control panel, while switches which are accessed less frequently are disposed at lower locations on the control panel. The generally central placement of the voltage selector switch 46 further helps to ensure that the operator will not accidentally select the wrong electrical outlet for use.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A control panel for a portable electric generator, comprising:
- a first zone including at least a first switch for the generator;
- a second zone disposed adjacent the first zone, the second zone including:
  - a first electrical outlet disposed adjacent a first end of the second zone; and
  - a second electrical outlet disposed adjacent a second end of the second zone opposite to the first end;
  - the first electrical outlet providing a first voltage output and the second electrical outlet providing a second voltage output which differs from the first voltage output; and
  - a second switch disposed longitudinally in said second zone between the first and second electrical outlets, for selecting one of said first and second electrical outlets for use.

2. The control panel of claim 1, further comprising a third zone disposed adjacent and parallel to the second zone, the third zone including a throttle control.

3. The control panel of claim 2, wherein each of the first and second zones comprise rectangular zones orientated horizontally and parallel both to one another and to the third zone.

4. The control panel of claim 1, wherein the first switch comprises an ON/OFF switch disposed at a first end of the first zone; and
- wherein the first zone further comprises a circuit breaker disposed at a second end of the first zone opposite to the first end.

5. The control panel of claim 4, wherein the ON/OFF switch and the circuit breaker are separated by an indicia member disposed at a substantially central position of the first zone.

6. The control panel of claim 1, further comprising:

a first subzone of the second zone, the first subzone having the first electrical outlet located therein;

a plurality of third electrical outlets disposed in side-by-side relationship with one another within the first subzone;

a second subzone of the second zone, the second subzone having the second electrical outlet located therein; and a third subzone of the second zone having said second switch located therein, the third subzone being positioned generally horizontally in-between the first subzone and the second subzone.

7. The control panel of claim 1, wherein the first and second zones are demarcated by a plurality of generally parallel extending frame members of a frame of the generator.

8. The control panel of claim 1, wherein the first zone is inclined relative to the second zone to thereby place the first switch at a non-vertical position.

9. A control panel for a portable electric generator having a frame, comprising:

a horizontally extending first zone including at least one switch;

a horizontally extending second zone disposed vertically adjacent the first zone, the second zone including:

a first electrical outlet disposed adjacent a first end of the second zone; and a second electrical outlet disposed adjacent a second end of the second zone opposite to the first end; and the first electrical outlet providing a first voltage output and the second electrical outlet providing a second voltage output which differs from the first voltage output;

wherein the first and second zones are further demarcated by at least one longitudinally extending frame member of the frame of the generator.

10. The control panel of claim 9, further comprising a voltage selector switch disposed within the second zone in-between the first and second electrical outlets for allowing a user to select one of the first and second electrical outlet for use.

11. The control panel of claim 9, wherein the at least one switch comprises:

an ON/OFF switch disposed adjacent a first end of the first zone; and a circuit breaker switch disposed adjacent a second end of the first zone opposite to the first end.

12. The control panel of claim 11, further comprising an indicia member disposed in-between the ON/OFF switch and the circuit breaker switch within the first zone.

13. The control panel of claim 9, further comprising a third zone disposed adjacent and parallel to the second zone, the third zone including a control for controlling an engine of the generator.

14. The control panel of claim 13, wherein the first, second and third zones are demarcated by a plurality of parallel disposed tubular frame members of the frame.

15. A control panel for a portable electric generator, comprising:

a first zone including at least an ON/OFF switch for the generator and a circuit breaker disposed at opposite ends of the first zone;

a second zone disposed vertically adjacent the first zone, the second zone including:

a first electrical outlet disposed adjacent a first end of the second zone; and a second electrical outlet disposed adjacent a second end of the second zone opposite to the first end;

the first electrical outlet providing a first voltage output and the second electrical outlet providing a second voltage output which differs from the first voltage output; and a switch disposed in-between the first and second electrical outlets within the second zone for selecting for use one of the first and second electrical outlets.

16. The control panel of claim 15, wherein the first and second zones are demarcated by a plurality of generally parallel extending frame members of a frame of the generator, each of the frame members positionable external to the first and second zones.

17. The control panel of claim 15, further comprising at least one ground fault interrupter electrical outlet positioned between the first and second electrical outlets of the second zone.

18. The control panel of claim 15, further comprising a third zone disposed horizontally adjacent to the second zone; the third zone including a control for controlling an engine of the generator.

19. The control panel of claim 15, further comprising a plurality of thermal breakers disposed adjacent respective ones of the electrical outlets, each being operably associated with respective ones of the respective electrical outlets.

20. The control panel of claim 15, wherein the second zone further comprises a first and a second subzone;

the first subzone including the first outlet and a plurality of electrical outlets disposed in a generally aligned arrangement, each of the first outlet and the plurality of electrical outlets operable at the first electrical voltage; and the second subzone including the second outlet.

21. A control panel for a portable electric generator, comprising:

a plurality of zones located one above the other and each including at least one of a switching control and a generator output device;

wherein a first zone of the plurality of zones includes:

a first AC outlet at a first zone end for providing a first AC output voltage;

a second AC outlet at a second zone end for providing a second AC output voltage different from the first AC output voltage; and a switch disposed between the first and second AC outlets for selecting one of the AC outlets for use.

22. The control panel of claim 21, further comprising a plurality of frame members demarcating the plurality of zones.

23. The control panel of claim 22, wherein the plurality of frame members comprise tubular frame members each extending outwardly at least partially beyond the plurality of zones.

24. A control panel for a portable electric generator, comprising:

a zone including:

a first AC outlet at a first end of the zone for providing a first AC output voltage;

a second AC outlet at a second end of the zone for providing a second AC output voltage different from the first AC output voltage; and a switch disposed between the first and second AC outlets, within the zone, for selecting one or the other of the AC outlets for use.

25. The control panel of claim 24, wherein the zone is oriented horizontally with the first end and the second end being located at opposite ends of the zone.

26. A control panel for a portable electric generator, comprising:

a plurality of zones configurable substantially parallel to each other and each including at least one of a switching control and a generator output device;

one zone of the plurality of zones including:

a first AC outlet for providing a first AC output voltage, and being disposed in a first subzone of the one zone; and a second AC outlet for providing a second AC output voltage different from the first AC output voltage, and being disposed in a second subzone of the one zone;

the first subzone located at a first end of the one zone;

the second subzone located at a second end of the one zone; and a switch disposed between the first and second AC outlets within the one zone for selecting one or the other of the AC outlets for use.

27. A control panel for a portable electric generator, comprising:

a first zone having a generator control switch located therein;

a second zone located parallel and adjacent to the first zone, including:

a first AC outlet at a first end of the second zone for providing a first AC output voltage; and a second AC outlet at a second end of the second zone for providing a second AC output voltage different from the first AC output voltage;

a switch disposed between the first and second AC outlets, within the second zone, for selecting one or the other of the AC outlets for use; and a third zone located below and parallel to the second zone.

28. The control panel of claim 27, wherein the third zone includes an idle control switch for a generator engine.

* * * * *

UNITED STATES PATENT AND TRADEMARK OFFICE

CERTIFICATE OF CORRECTION

PATENT NO. : 7,224,578 B2
APPLICATION NO. : 10/914683
DATED : May 29, 2007
INVENTOR(S) : John E. Buck et al.

It is certified that error appears in the above-identified patent and that said Letters Patent is hereby corrected as shown below:

Title Page,
Item (45), "May 29, 2007" should be --*May 29, 2007--.

Title Page,
Item (*), Notice, insert: --This patent is subject to a terminal disclaimer.--.

Signed and Sealed this
Eleventh Day of October, 2011

David J. Kappos
*Director of the United States Patent and Trademark Office*